March 19, 1963    G. A. DUMMETT ETAL    3,082,090
PRODUCTION OF BREWERS' WORT
Filed March 21, 1960    2 Sheets-Sheet 1
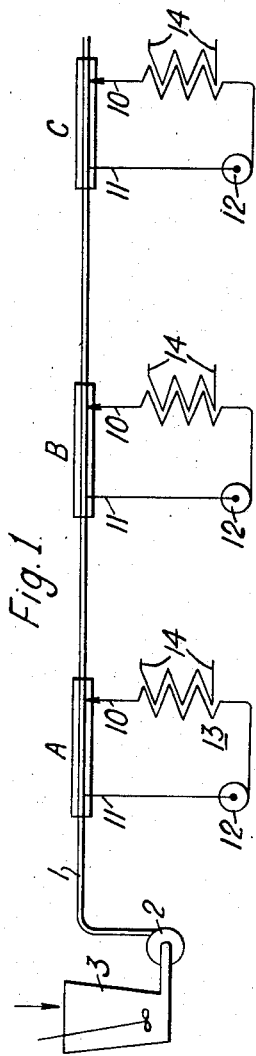
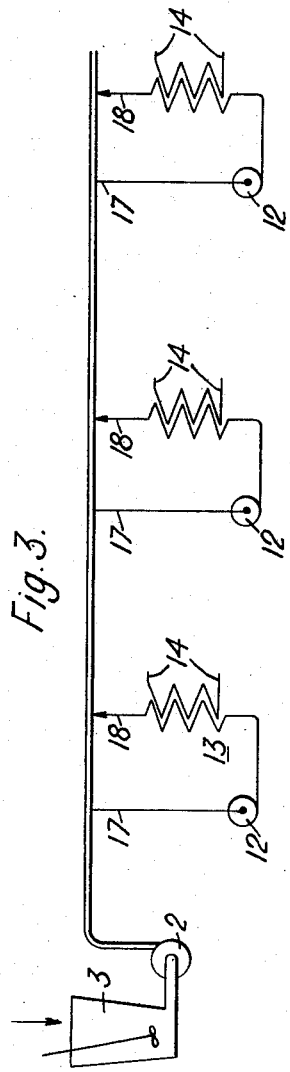
Inventors
George Anthony Dummett
and
David Teignmouth Shore
BY Baldwin & Wight
Attorneys March 19, 1963  G. A. DUMMETT ETAL  3,082,090
PRODUCTION OF BREWERS' WORT
Filed March 21, 1960  2 Sheets-Sheet 2
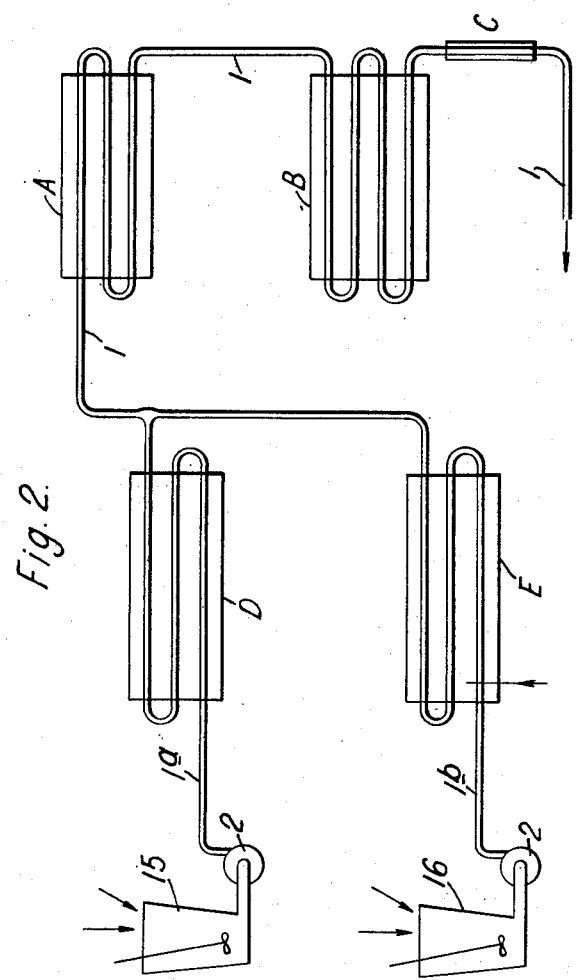
Inventors
George Anthony Dummett
and
David Teignmouth Shore
BY Baldwin & Wight
Attorneys

United States Patent Office 3,082,090
Patented Mar. 19, 1963

3,082,090
PRODUCTION OF BREWERS' WORT
George Anthony Dummett, Fairwarp, near Uckfield, and David Teignmouth Shore, Banstead, England, assignors to The A.P.V. Company Limited
Filed Mar. 21, 1960, Ser. No. 16,281
Claims priority, application Great Britain Mar. 20, 1959
1 Claim. (Cl. 99—52)

This invention relates to the production of brewers' wort in the mashing stage at which a liquor, known as sweet wort is produced, from a mixture of liquid (usually water) and a malt grist, by a process of conversion and extraction, the sweet wort passing on after filtration for further processing.

Modern development of brewery practice requires that the liquor shall be in continuous progression through this mashing stage as well as the other stages of treatment: it is however essential that the mixture of liquor and malt shall be held at a certain temperature or range of temperatures during this mashing action and also that the mixture shall be allowed to remain more or less undisturbed for a time interval which is sufficient to enable the necessary extraction and enzymic reactions to occur.

These requirements are met in accordance with the present invention by feeding the mixture of liquor and malt continuously to a duct which is equipped with means such as a heating jacket or a number of heating jackets along its length so as to enable the temperature of the mixture as it flows in the duct to be held at a predetermined value or values during the conversion and in addition the duct is so dimensioned that a given mixture although moving continuously through the duct will remain undisturbed as to the suspension of the solids or semi-solids in the mixture and will move at a rate such that the desired conversion will be more or less completed while in the duct.

The malts used in the brewing industry differ considerably in character and in many instances the grist consists of cereals which are either mashed in with malt or cooked separately before being added to the main brew. For most British beers the adjuncts with the malt are mashed in a single stage. During the conversion process occurring in the flow in the duct for continuous mashing, different time/temperature cycles are required to enable a close control to be exercised over the ratio of fermentable to unfermentable sugars and also other chemical changes taking place in the particular mash benig treated and the invention enables that control to be readily obtained.

The temperature control can be achieved by a heating jacket disposed about the duct and included in a flow of temperature control medium the temperature of which is regulated to produce the desired reaction or it could comprise electrically energised elements.

Again provision could be made to withdraw a part of the plug flow in the duct, passing the withdrawn flow in indirect heat exchange with a heating or cooling medium and then returning the now temperature conditioned flow to the duct.

The said means could be arranged so to control the temperature that it has the same predetermined value over the length of the duct or it could be arranged to enable the temperature so to be controlled as to have different values at different zones in the length of the duct. The temperature control could be obtained by constituting the duct (regarded as such in the overall flow) by a number of separate but interconnected ducts each having its own temperature control: in addition for certain products the component parts making up the product when they are combined could flow, in plug fashion as determined by the size of the duct through separate ducts having their own temperature control the out-put of the ducts being combined in a flow through a further duct or ducts also having temperature control: this latter arrangement could be used for brewing Continental and other beers in which large quantities of starch material are employed. In such cases the starch material is not necessarily mashed with the malted material but is separately "cooked" before mixing with the malt mash.

In such cases the starch material could be mashed by the plug flow in its own duct which is heated to cook the mash as it progresses through the duct.

Depending on the ratio of the malted to unmalted material and also its nature and composition, it may be necessary to mix the two mashes in a small mixing vessel and then to pump the mixture to a tube mashed according to this invention to establish the main conversion during plug flow. The use of this mixing vessel and the pump ensures intimate mixing of the two mashes so as to improve the conversion efficiency of starch to sugars by avoiding concentration gradients of malted to unmalted materials in the mash.

By the invention therefore the time/temperature cycle can be set to suit the different requirements of the different malts while at the same time conserving the required plug flow. As an operating condition it is very desirable that there shall be no large temperature gradients so as to avoid the creation of turbulence in the "plug" flow of mixture which takes place in the duct.

When a jacket is used, the heating medium employed can be the attemperatured liquor which is produced in the beer brewing process but steam or hot water from other sources could be used. Thus, the invention enables the essential requirement of the mashing operation, i.e that the mixture shall remain undisturbed during the reaction, to be complied with while at the same time enabling the mashing action at determined temperatures to be adapted to the requirements of modern processing with its requirement for continuous movement of liquor throughout the complete processing of wort to the final fermentating stage.

The precise form of the duct will of course depend on the requirement and conditions required for complete mashing in any particular case: it can however be said that the duct must be such in relation to the mixture and its rate of flow that the solid constituents of the mixture shall more or less interlock to form the plug. This involves the duct size to be selected to produce a rate of flow which depends on the ratio of grist to liquor in any particular case.

It has been found that when the conditions are selected to produce this plug formation of the mixture there is no preferential flow of liquor to solids even when the flow is required to take place in swept bends which may well have to be provided in the duct to provide a built up length of duct sufficient for the complete reaction There is however an intimate mixing of the constituent due to movement of the liquor in the interstices between the solids.

Not only does the invention enable the mashing process to be adapted for inclusion in the modern continuous method of wort treatment but it also provides more efficient mashing action than is given by the normal process employing a mash tun.

The intimate mixing referred to above promotes rapid conversion when compared with the conventional mash tun practice and furthermore enables a much closer temperature control to be effected either on the whole mash or on a particular time cycle employed by the brewer.

The importance of creating the moving plug is empha ised by the fact that any breakdown in the plug has been found to result in a preferential flow of liquid to solids resulting in instability, poor conversion to sugars and probably to possible blockage of the duct by the solids.

Experiments which have been made show that the rate of flow of the mixture should be high rather than low so as to reduce the effects of local disturbances such as eddies: thus by way of example the ducts can be selected to produce a rate of flow of between 1" and 48" per minute when the duct is circular of diameters between ½" and 12". Thus excellent results have been obtained for the British mashing rate of between 2–2½ barrels of liquor per quarter of grist by using a duct in the form of a circular tube having an internal diameter of 3" and a length of 100 feet which can be made up of lengths of tube connected by bends.

Following the conversion stage in the flow in the duct where close temperature control has in conjunction with the holding periods enabled a close control to be made of the wort composition, a final section of the duct could be heated to a temperature sufficient to destroy further enzymic activity and to prevent further changes of wort composition during a following filtration stage. This final heating stage could bring the temperature of the mash to at least 170° F., and in some cases may bring the mash to its boiling point.

The invention is illustrated in the accompanying drawings which show diagrammatically various installations all of which make use of ducts such as to create a condition of plug flow.

In the installation shown in FIG. 1 a duct marked 1 receives a liquor comprising a mixture of malt, cereal and hot water from a vessel 3, the supply to the duct being effected by a pump 2. As has been described by a selection of the variables which are involved in establishing a flow of the liquor through the duct 1, the mixture will advance continuously along the duct in the form of a plug and at a rate which will enable the required reaction to take place during the flow in the duct although at the same time the constituents remain quiescent or sensibly so.

In addition provision is made to enable the temperature at which the reaction takes place to be regulated to suit the different requirements which arise in different cases. For that purpose, the duct 1 is jacketted to receive a heating or a cooling medium: the jacketting can extend over the complete length of the duct or as is shown in FIG. 1 the duct can be jacketted in various sections A, B, C each having its own supply and discharge connections 10, 11 by which the jackets can be included in a circulation effected by pumps 12 of a temperature control medium.

The temperature of the medium can be controlled by indirect heat exchange with a heat input or extraction medium (such as steam) supplied to heat exchangers 13 by flow lines 14.

The installation shown in FIG. 2 is arranged for the production of a product the components of which require to be separately "cooked" or otherwise subjected to heat action before the ingredients are mixed to provide a mixture which itself requires to be subjected to some heating (or cooling) action.

In this case it will be assured that the components of the final mixture consists of an admixture of malted liquor forming a mash which is produced in the vessel 15 and a mash consisting of starch or cereal liquor which is produced in the vessel 16. The two mashes are delivered by pumps 2 to separate ducts 1ª, 1ᵇ, which are such as to establish the required plug flows of the two mashes and these plug flows are united in a duct 1 again dimensioned to establish the plug flow.

In such a case, the temperature conditions under which the reactions in the two mashes take place during their plug flow in the ducts 1ª, 1ᵇ is regulated by jacketting those ducts as indicated at D, E: the jacket D provides a controlled temperature zone through which the malt mash flows without disturbance for a predetermined time: the jacket E provides a similar controlled temperature zone for the treatment of the starch or cereal mash and enables that mash to be pre-treated independently of the malt mash.

The mixture of the two mashes then flows through the duct 1, which (as in the arrangement shown in FIG. 1) is provided with jackets A, B, C to complete the conversion during the plug flow through the duct 1, the product finally passing to a mash filter (not shown) of conventional form.

In FIG. 3 is shown a modified installation which still relies on the principle of plug flow but which consists in controlling the temperature by withdrawing a part of the flow to subject it to a heating (or cooling) effect and then returning that part of the flow to the main flow. The installation in general follows that of FIG. 1 but the jackets A, B, C are dispensed with, the various pumps 12 extracting a part of the plug flow from the duct through lines 17, and supplying it to the heat exchangers 13 the temperature controlled out-put of which is returned to the duct 1 via the lines 18.

We claim:

Regulating the production of sweet brewers' wort by the method which comprises continuously feeding different mixtures of grist and liquor to different ducts each of such cross-sectional dimension in relation to the supply as to cause the mixture fed to the duct to advance as a quiescent plug in the duct, in controlling the temperature of the mixture in each duct, in combining the out-put from the different ducts and passing the collected mixture to a similar duct in which the temperature of the plug flow is regulated to complete the conversion of the mixture while it is advancing as a plug flow in the said similar duct.

References Cited in the file of this patent
UNITED STATES PATENTS 2,240,338    Locke _____ Apr. 29, 1941
2,811,336    Bready _____ Oct. 29, 1957